May 30, 1933.  J. N. NAULTY  1,911,842
EYESHADE
Filed Nov. 30, 1932  2 Sheets-Sheet 1
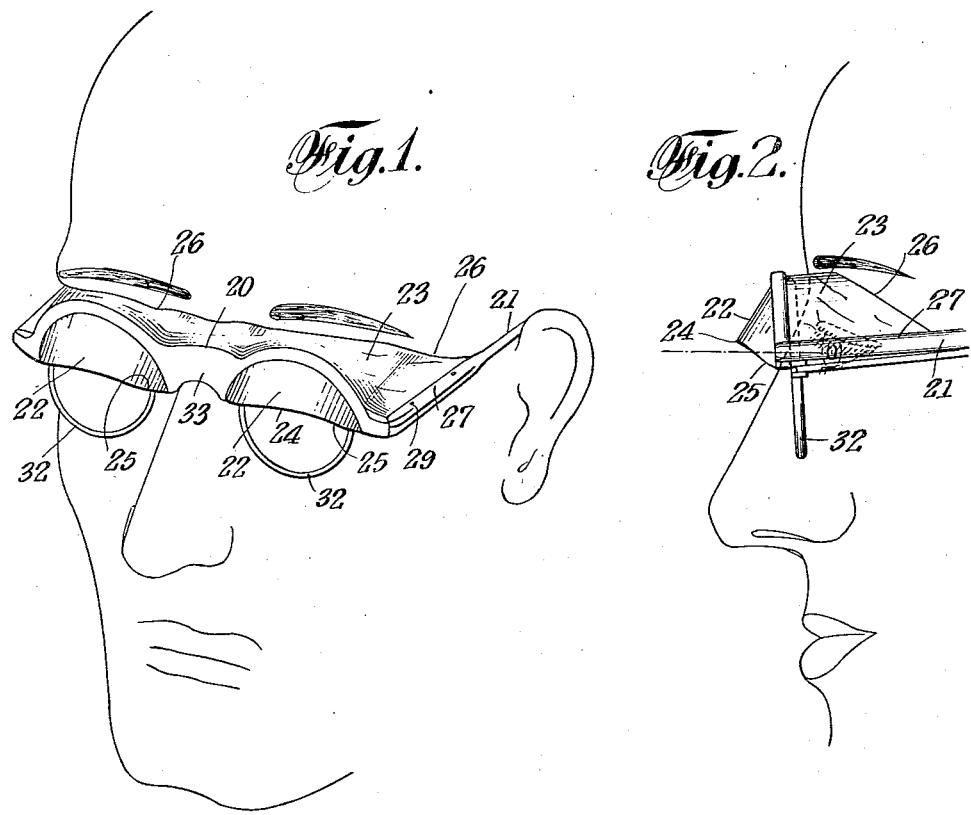
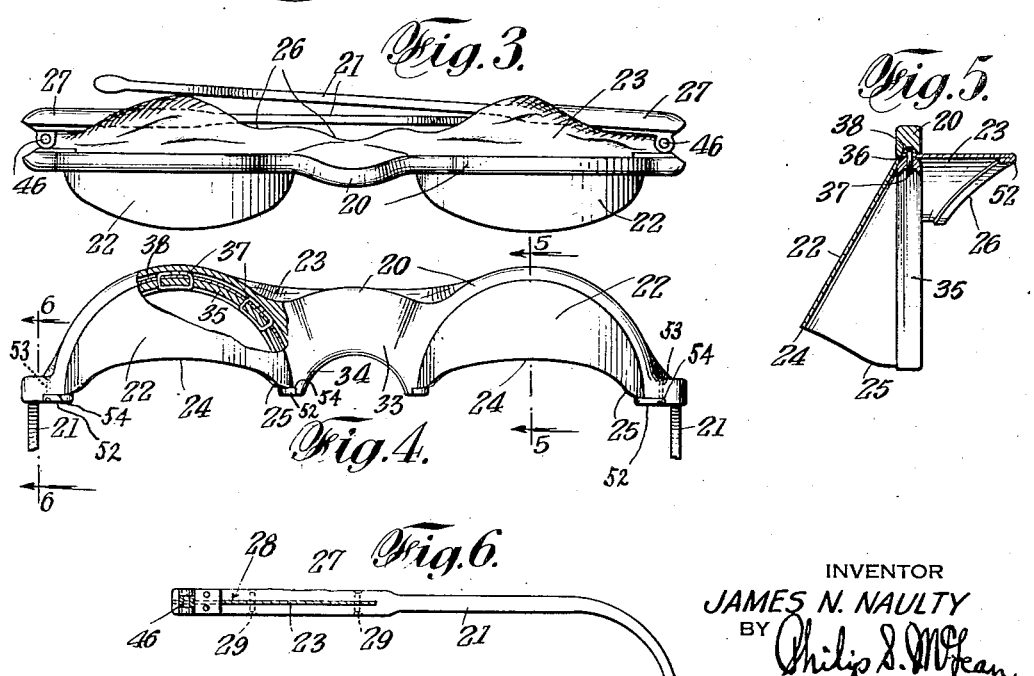
INVENTOR
JAMES N. NAULTY
BY
ATTORNEY

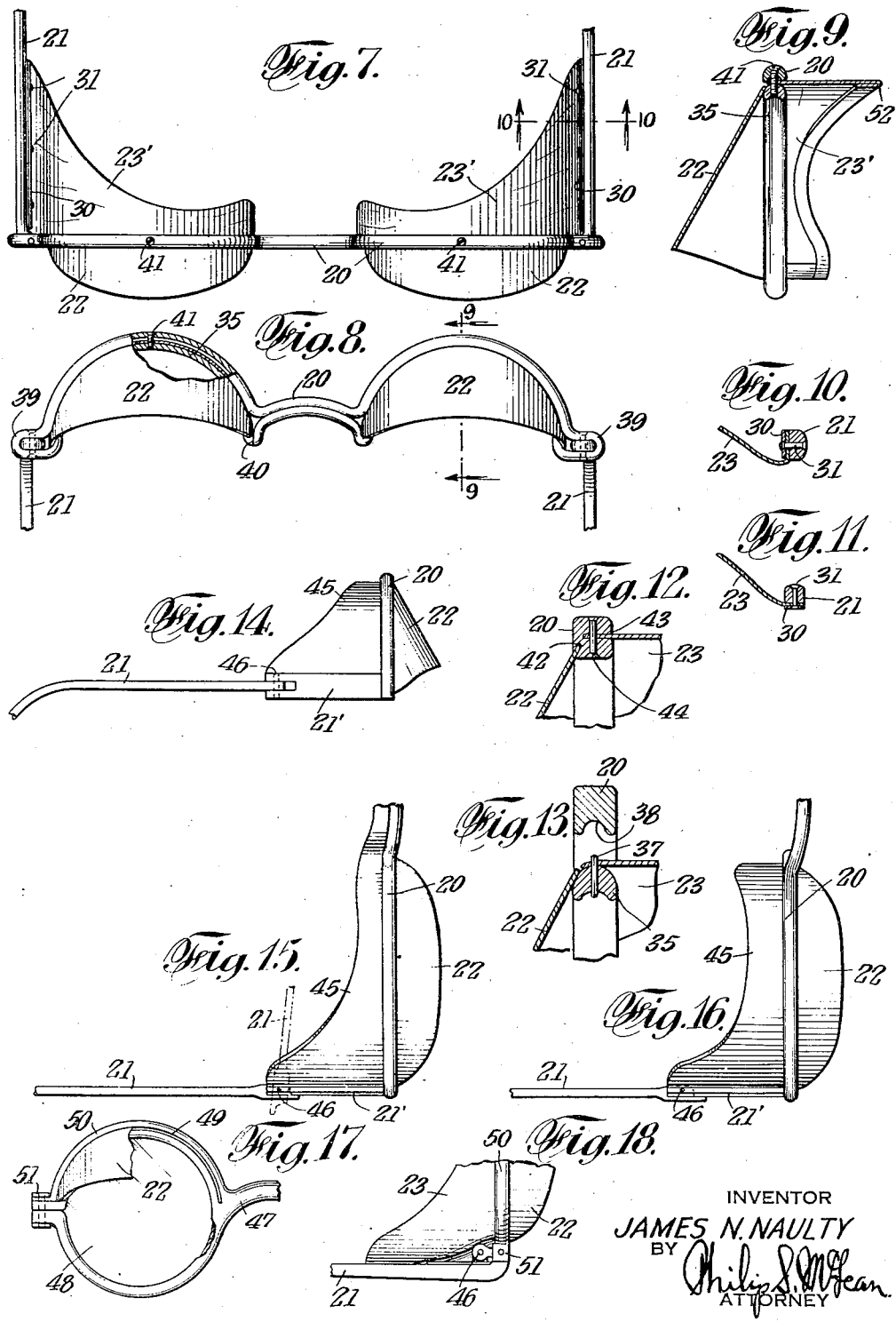

Patented May 30, 1933

1,911,842

UNITED STATES PATENT OFFICE

JAMES N. NAULTY, OF EAST ORANGE, NEW JERSEY

EYESHADE

Application filed November 30, 1932. Serial No. 644,963.

The objects of this invention are to shield and protect the eyes from glaring light and wind and to accomplish this in a simple practical way and with means which will be comfortable to the user.

A further, important object, is to provide an eyeshade having the above characteristics, which will conform to and actually fit the face of the wearer, in so doing, in effect, clinging to the features in such a way as to make it especially suitable for outdoor use, as in sports and games where the eyes usually are subjected to the strain of sun and wind.

The foregoing and other desirable objects are attained by the novel constructions and combinations hereinafter described and broadly covered in the claims.

The drawings accompanying and forming part of the specification illustrate various embodiments of the invention, but it will be understood, as the features of the invention are appreciated, that the structure may further be varied, all within the true intent and broad scope of the invention.

Fig. 1 is a perspective view, illustrating one form of the invention as in use over a pair of spectacles or eye glasses.

Fig. 2 is a broken side view of the device as in use.

Fig. 3 is an edge view of the shade in folded relation.

Fig. 4 is a front view of the device modified slightly, as for use without eye glasses and shown partly broken and in section for illustration of details.

Figs. 5 and 6 are sectional views as on substantially the planes of lines 5—5 and 6—6 of Fig. 4.

Figs. 7 and 8 are broken plan and front views respectively of another modification.

Fig. 9 is a sectional view as on line 9—9 of Fig. 8.

Fig. 10 is a sectional detail as on line 10—10 of Fig. 7.

Fig. 11 is a similar view, illustrating a slight modification.

Figs. 12 and 13 are fragmentary sectional views, illustrating different ways of fastening the parts together.

Figs. 14 and 15 are side and broken plan views respectively of a modified form of temple construction.

Fig. 16 is a view showing parts similar to those of Fig. 15, but illustrating the feature of the top shields being separate instead of connected as in Fig. 15.

Figs. 17 and 18 are fragmentary broken front and plan views respectively of a further modified construction.

These illustrations show that the invention may be made up in a variety of forms. All these forms however embody a light frame consisting of bridge and temple portions 20, 21 and carrying the front and top shields 22, 23.

The front shields 22 are shown as individual visors, one over each eye, inclined downwardly and forwardly to near the normal horizontal line of vision, as indicated at 24, in Fig. 2, the edges curving downwardly in opposite directions away from this level as shown at 25.

The top shield 23 extends from the top of the frame rearwardly, over the upper eyelids and is curved at the rearward edge, as indicated at 26, to fit the configuration of the upper eyelids, beneath the eyebrows. This top shielding portion in the commercial embodiments of the invention actually extends into the eyeball cavities, beneath the frontal bone, to shut out all top light and also to hold the shade structure down in supported position on the bridge of the nose.

To make the top shading portion as close fitting and as comfortable as possible, the same is usually constructed of some soft flexible material, such as soft leather and to keep this shade fully spread, it may be connected along its side edges, with the temples substantially as indicated at 27.

Various methods of attachment may be used. Thus in Figs. 1 to 6, the flexible top shielding material is attached to the temples by inserting the edges of the same between the split end portions 28 of the temples, which then are secured together over the shield material by rivets or other suitable through fastenings 29.

Figs. 10 and 11 show how the flexible top shielding material 23 may be secured to the temples by overlying strips 30, fastened by rivets 31, either to the inner or lower sides of the temples.

The device is shown in Figs. 1, 2 and 3 as intended for wearing over a pair of spectacles or eyeglasses 32 and in this case, the top shielding material is extended clear across the frame from one temple to the other, so as to prevent any light entering from above from striking in back of the glasses. Also, the bridge portion 33 resting on the nose is closed between the visors 22, to prevent light striking the glasses from over the top of the nose.

For the sake of lightness, the bridge portion may be only a half-frame, as particularly shown in Fig. 4 and in such construction, all lower edges of the frame are preferably smoothed off, so as to leave no distracting projections to catch the eye.

The shielding material may be secured in the frame by cementing or otherwise. Thus as shown in Figs. 4 and 5, the top shade material may be secured at its forward edge to liners 35, shaped to fit within the hollows of the half frames, being secured therein as by cement or the like, and having secured to them by cement or the like at 36, the front visors 22. The top shade material is shown as mechanically secured to these liners by means of clinched staples 37, which set into the grooves 38, inside the hollows of the visor frame.

The construction illustrated in Figs. 7, 8, 9, also intended for direct use without eyeglasses, differs from that last described, particularly in that the top shading material does not extend continuously across from one temple to the other and is in the form of two separate shades 23', one over each eyelid and substantially coextensive rearwardly from the visors at the front of the frame. The frame itself is different in this case, in that the bridge 20 and liners 35 are all one continuous piece molded or shaped as companion parts connected at the ends by temple pivoting loops 39. The inside portion of this bridge piece is shown as interrupted at 40, so that such inside parts may be sprung open to receive the front and top shields and then be fastened together as by screws 41, cement and the like, or both screws and cement.

As another alternative, the visors and top shielding material may be secured as illustrated in Fig. 12 by setting the same into grooves 42, 43, formed respectively at the proper angle for the inclined visors, in the front of the bridge piece and at the right level for the top shields in the back of the bridge piece, the shielding material being secured in these grooves by cement or other medium, or rivets 44, through the split portions.

The flexible top shielding material has the great advantage of enabling the eyeshade to be folded up into relatively flat compact form, as in Fig. 3. For some uses however, it may be considered preferable to use a relatively stiff and rigid material for the top shields, as shown at 45, in Figs. 14, 15 and 16. In such case, the front temple part 21' is non-foldable and rigid with the bridge frame and the temple pivots 46 are then located at the rear of these rigid backward extensions of the frame. This construction will not fold up so compactly, but may stand rougher handling than the close folding flexible type of construction. Also in this construction, the hinging portions of the temple are shorter, so as to fold more readily against the back of the frame.

The Figure 16 construction differs from the Figure 15 form in the same way that the Figure 7 form differs from the showing in Figure 1, that is that the top shields are separate, one over each eyelid, instead of co-extensive from one temple across to the other.

Figures 17 and 18 are illustrative of the fact that the invention may be directly combined with lenses by using complete eye-glass frames 47, grooved to hold the lenses 48 and slotted across the top at 49, to provide the upper resilient frame portions 50, for clampingly holding the visors 22 and top shield 23. To secure these spring clamping portions 50 and the split end portions of the lens frames together, suitable through fastenings 51 are provided and these fastenings are indicated in Fig. 18 as carrying the temple pivots 47.

The visors and top shields may be of translucent or opaque materials and in colors such as green and orange, especially suited to the shading of the eyes. The extension of the top shades to the temples is particularly important for holding the shading material in its protective shape, fully shielding the eyes at the sides. The hollows in the half frames are simply to hold the visors and so may be shaped to hold the most effective shape of the visor. It has been shown that the invention may be made up to wear over ordinary eye-glasses, or to be used without eye-glasses, or finally to be actually combined with the eyeglasses. The top shade may be made with rolled edges as indicated at 52, in Figs. 5 and 9, to comfortably fit over the eyelids beneath the eyebrows and this light engagement beneath the eyebrows affords sufficient grip to prevent the eyeshade being displaced by wind or by sudden movements of the body, as in athletic games. The device does not interfere with the full use and benefit of spectacles and eye-glasses, it not being in the nature of an attachment which would hinder or interfere with the best use of eye-glasses. The parts may be adjusted in putting them together to best suit the eyes and the facial configuration and possible special uses to which the eyeshades are to be put. Where the liners or inside clamp members are formed as parts separate from the half-frame as at 35, in Figs. 4, 5, 13, the ends of the same may be extended laterally as at 52' and there secured as by cement or rivets 53, in extensions 54, of the grooves 38, provided to receive the same. These end lugs definitely position and secure the liners in proper, fixed relation in the frame.

What is claimed is:

1. An eyeshade comprising a frame consisting of a front bridge portion and rearwardly extending temples, eye shielding material extending rearwardly from said bridge portion and connected with said temples, said temples comprising rigid forward portions to which the eye shielding material is attached and hinging rearward portions pivoted to said rigid portions.

2. An eyeshade comprising a split frame having relatively separable coextensive portions, eyeshading material entered between said coextensive portions of the split frame and means for securing said coextensive portions together in holding engagement over said eyeshading material.

3. An eyeshade comprising a split frame having relatively separable coextensive portions, eyeshading material entered between said coextensive portions of the split frame, means for securing said coextensive portions together in holding engagement over said eyeshading material, portions of said eyeshading material extending forwardly and downwardly as an inclined visor and other portions extending rearwardly as a glare excluding top shield.

4. An eyeshade comprising a bridge made up of counterpart sections, eyeshading material engaged between said counterpart sections and means securing said counterpart bridge sections together over said eyeshading material.

5. An eyeshade comprising a light bridge piece extending downwardly only to the approximate region of the horizontal line of vision, eyeshading visors seated in said bridge piece, temples attached to the ends of said bridge piece and top shading material attached to the bridge piece and temples and all said parts terminating at a lower level above or in the region of the line of vision and without abrupt lugs or angles to distract the eyes as so shielded.

6. An eyeshade comprising a bridge member and attached temples, said temples being longitudinally split adjoining the attachment with the bridge piece and eye shielding material extending rearwardly from the bridge piece and entered between said split portions of the temples.

7. An eyeshade comprising a bridge piece, temples attached thereto, soft flexible top eye shielding material attached along the forward edge of the same to the top of the bridge piece and extending rearwardly from the top of said bridge piece in generally horizontal relation and downwardly at its end edges to the temples and split portions of said temples forming clamp means holding said end edges of said eye shielding material to said temples.

8. In combination, a nose piece hollowed over the eyes, shade material set in said hollowed portion of said nose piece and clamp means shaped to fit the hollow of the nose piece, in holding engagement with said shade material and having laterally projecting end lugs, said nose piece having grooves receiving said projecting lugs and means securing said lugs in the grooved portions of the nose piece, to thereby definitely position and secure said clamp means and shade material.

9. The herein disclosed eyeshade, comprising a frame in the nature of the upper half of an eye glass frame and including a substantially vertically supported nose piece with arches over the eyes and temples at the ends of said nose piece and foldable over the back of the same, visors attached to the arched portions of the nose piece and projecting downwardly and forwardly therefrom to near but to less than the normal horizontal level of vision and top shading material in generally horizontally extending relation and having its forward edge conforming and attached to the arched portions of the nose piece, the end edges being attached to the temples and the rearwardly disposed edges being shaped to fit the eye contour in back of the same and held by the temples in close relation, excluding light from above the eyes to the visors protecting the eyes at the front.

10. The herein disclosed eyeshade, comprising a frame in the nature of the upper half of an eye glass frame and including a substantially vertically supported nose piece with arches over the eyes and temples at the ends of said nose piece and foldable over the back of the same, visors attached to the arched portions of the nose piece and projecting downwardly and forwardly therefrom to near but to less than the normal horizontal level of vision and top shading material in generally horizontally extending relation and having its forward edge conforming and attached to the arched portions of the nose piece, the end edges being attached to the temples and the rearwardly disposed edges being shaped to fit the eye contour in back of the same and held by the temples in close relation, excluding light from above the eyes to the visors protecting the eyes at the front, the said shielding material being flexible and foldable by the temples to a flat folded condition against the back of the nose piece and being held by the temples when opened spread in comfortably fitting engagement with the eye portion of the face.

In testimony whereof I affix my signature.

JAMES N. NAULTY.